United States Patent
May et al.

(10) Patent No.: US 7,213,926 B2
(45) Date of Patent: May 8, 2007

(54) IMAGE PROJECTION SYSTEM AND METHOD

(75) Inventors: Gregory J. May, Corvallis, OR (US); William J. Allen, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 369 days.

(21) Appl. No.: 10/987,603

(22) Filed: Nov. 12, 2004

(65) Prior Publication Data

US 2006/0103811 A1 May 18, 2006

(51) Int. Cl.
*G03B 21/14* (2006.01)
*G02B 27/64* (2006.01)

(52) U.S. Cl. .......................... 353/69; 353/122; 359/554
(58) Field of Classification Search ................. 353/69, 353/122, 100; 359/554
See application file for complete search history.

(56) References Cited

U.S. PATENT DOCUMENTS

| | | | |
|---|---|---|---|
| 3,756,710 A | 9/1973 | Taylor | |
| 4,059,351 A | 11/1977 | Wisotsky | |
| RE32,662 E | 5/1988 | Pennington | |
| 4,876,429 A | 10/1989 | Buchler | |
| 5,396,301 A | 3/1995 | Sasaki et al. | |
| 5,683,297 A | 11/1997 | Raviv | |
| 5,795,227 A | 8/1998 | Raviv | |
| 5,905,567 A | 5/1999 | Dewan | |
| 6,191,407 B1* | 2/2001 | Cooper | 250/208.1 |
| 6,552,713 B1 | 4/2003 | Van Brocklin et al. | |
| 6,590,606 B1 | 7/2003 | Hiller et al. | |
| 6,729,734 B2 | 5/2004 | Childers et al. | |
| 6,806,850 B2 | 10/2004 | Chen | |
| 6,811,267 B1 | 11/2004 | Allen et al. | |
| 6,817,717 B2 | 11/2004 | Childers et al. | |
| 6,817,722 B1 | 11/2004 | Cole et al. | |
| 6,817,723 B1 | 11/2004 | May | |
| 7,057,640 B2* | 6/2006 | Bellwood et al. | 348/173 |
| 2002/0131018 A1 | 9/2002 | Lucas | |
| 2002/0135738 A1 | 9/2002 | Cok et al. | |
| 2003/0038927 A1* | 2/2003 | Alden | 353/122 |
| 2003/0038928 A1* | 2/2003 | Alden | 353/122 |
| 2003/0117370 A1 | 6/2003 | Van Brocklin et al. | |
| 2004/0070694 A1 | 4/2004 | Haruna et al. | |
| 2004/0186618 A1 | 9/2004 | Blaine | |
| 2005/0099607 A1 | 5/2005 | Yokote | |
| 2006/0119799 A1* | 6/2006 | Ullmann | 353/69 |
| 2006/0256298 A1* | 11/2006 | Knipe | 353/69 |

FOREIGN PATENT DOCUMENTS

EP 1 607 795 A 12/2005
WO WO 2004/086135 A 10/2004

* cited by examiner

Primary Examiner—William C. Dowling

(57) ABSTRACT

In an embodiment, an apparatus includes a projection subsystem to project an image-containing beam, and an image adjustment element. The image adjustment element is to cause adjustment of the image-containing beam in response to a detection of relative movement of the apparatus with respect to a reference object. A method includes determining whether substantial relative movement of a projection system has been detected, in an embodiment. When substantial relative movement has been detected, the method further includes producing control inputs, and altering operation of one or more image adjustment elements and/or altering image data in response to the control inputs, in an embodiment.

19 Claims, 11 Drawing Sheets

IMAGE PROJECTION SYSTEM AND METHOD

TECHNICAL FIELD

The inventive subject matter relates to projection systems, and more particularly, to projection systems that may be operated under conditions or in environments where the projection system may be subjected to movement with respect to a projection surface or a projected image.

BACKGROUND

Projection equipment (i.e., a "projector") may be used to display images onto a projection surface (e.g., a screen or wall). A conventional projector may be mounted to or set on a stable surface, such as a ceiling or table, for example. Under normal conditions, a conventional projector will not likely be subjected to significant movement or vibration, and the relative position between the projector and the projection surface will remain constant. Accordingly, the images that it projects will appear relatively still and stable on the projection surface.

If conditions exist under which a conventional projector or its projection surface are subjected to relative movement or vibration, the projected image will appear unstable, and the image may appear jittery or out of focus. For example, even a slight projector movement, with respect to a projection surface, may lead to a significantly destabilized image, and details included in the destabilized image may not be perceptible. If the image is being displayed in the context of a presentation, the destabilization effect may significantly reduce the effectiveness of the presentation. Accordingly, a conventional projector is practically limited to use in connection with a stable, non-vibrating surface, where the distance between the projector and the projection surface remains relatively constant.

BRIEF DESCRIPTION OF THE DRAWINGS

Like-reference numbers refer to similar items throughout the figures and.

DETAILED DESCRIPTION

Various embodiments may be implemented in a projection system, which includes elements that may reduce obfuscation (e.g., blurring, distortion, and/or shaking) of still and/or dynamic images that are projected by the projection system. An "image," as used herein, means a static or dynamic representation of information, which may be perceived visually. Accordingly, and image may include, but is not limited to, textual information, pictorial information, a photograph, a graph or chart, a presentation slide, a series of images (e.g., a motion picture), combinations of these items, and other information-conveying visual representations. As the below description indicates, embodiments of the inventive subject matter may reduce blurring, distortion, and/or shaking perceived within a projected image, which would otherwise be perceptible due to vibration, orientation change or movement of the projection system with respect to a projection surface or a projected image.

Embodiments may be included in a number of projection system types, including but not limited to portable and/or handheld projectors, projectors used within vehicles (e.g., airplanes, trains, automobiles, ships, spacecraft, etc.), front- or rear-projection instrument panels, front- or rear-projection entertainment devices, projectors used in other vibratory and/or moving environments, and surface-mounted projectors, to name a few. Embodiments also may be incorporated into projection systems that are used in environments or applications that may not experience significant vibration or movement, such as desktop, tabletop, ceiling, or wall mounted projectors. The term "mount," as used herein, includes mounting by affixing a projector to a surface and mounting by setting a projector on a surface.

Further, embodiments may be incorporated in front-projection systems and rear-projection systems. For example, but not by way of limitation, a front-projection system may be intended to project images on a surface that may include a wall, an opaque screen or another substantially flat surface. A rear-projection system may be intended to project images on a surface that may include a fully- or partially-transparent glass screen or plastic screen.

Figure 1:
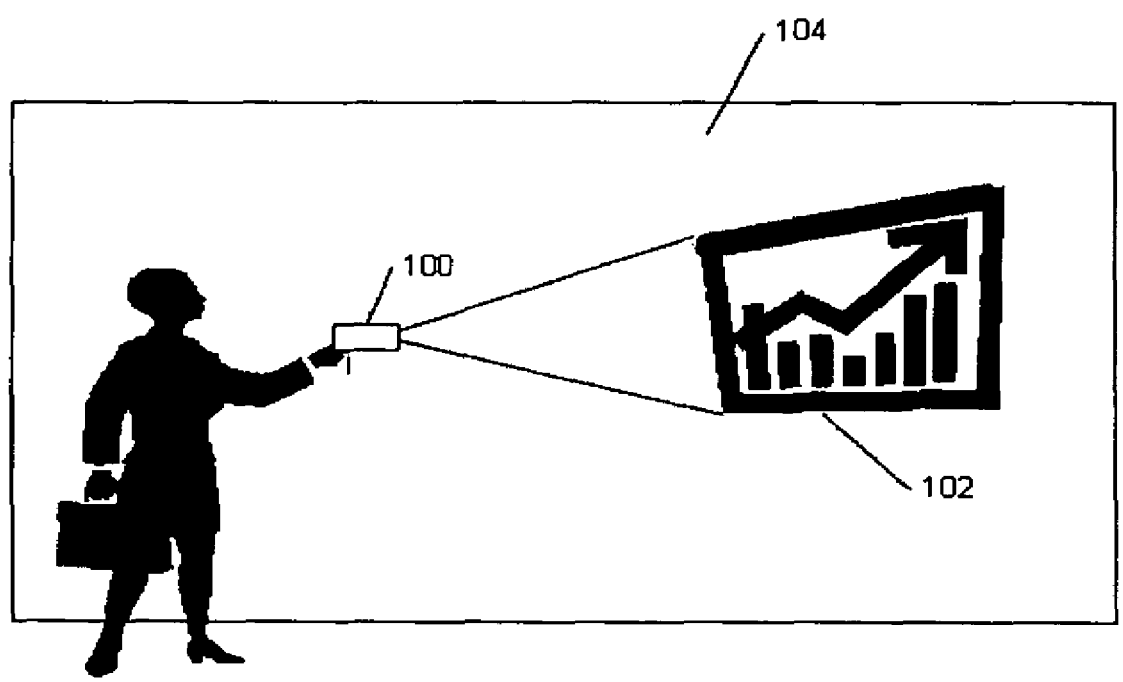
FIG. 1 is a perspective view of a person using a handheld projection system, in accordance with an embodiment.

FIG. 1 is a perspective view of a person using a handheld projection system 100, in accordance with an embodiment. In an embodiment, projection system 100 includes various processing and optical elements, which enable one or more images (e.g., image 102) to be projected onto a projection surface, such as wall 104. As will be described in detail below, projection system 100 also may include various mechanisms for sensing "relative movement" of the projection system 100 with respect to the image 102 and/or with respect to the projection surface. Further, various embodiments may include mechanisms for compensating for the relative movement by adjusting the image-containing beam that results in the projected image 102. The term "relative movement," as used herein, means a change in the relative position, orientation, or distance between the projection system 100 and the image 102 or the projection surface.

Adjustment of the projected image 102 may result in a reduction of negative visual effects on the projected image 102, which otherwise may result from relative movement of the projector with respect to the projection surface or the projected image. Accordingly, the image 102 may appear clearer in a vibratory or relative-motion-affected environment, using embodiments of the inventive subject matter, than it would if the embodiments were not incorporated into the projector system. Accordingly, advantages of various embodiments may be perceived most readily in applications in which a projection system is used in environments where projector vibration is present and/or in environments where relative movement occurs between a projector and a projection surface or projected image.

Figure 2:
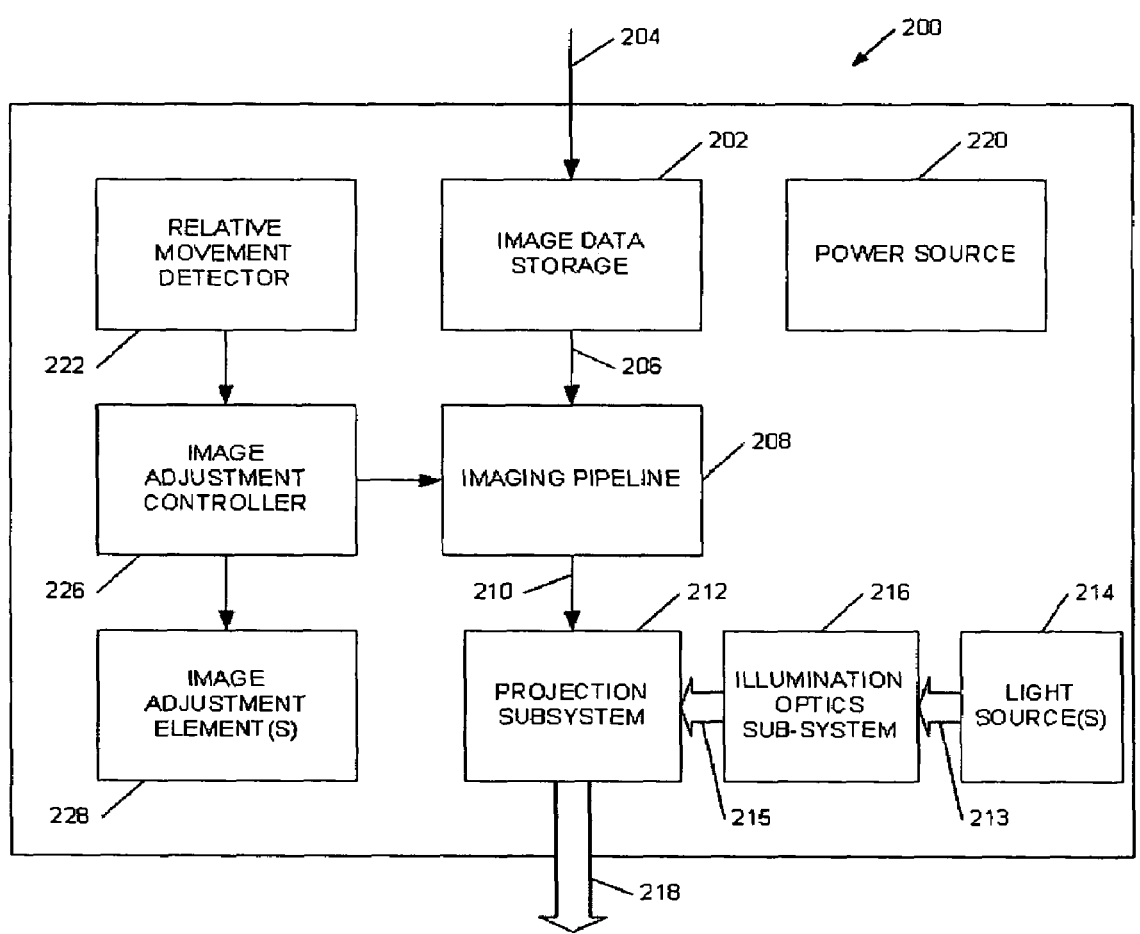
FIG. 2 is a simplified block diagram of a projection system, in accordance with an embodiment.

FIG. 2 is a simplified block diagram of a projection system 200, in accordance with an embodiment. System 200 includes an image data storage mechanism 202, an imaging pipeline 208, a projection subsystem 212, a light source 214, a power source 220, a relative movement detector 222, an image adjustment controller 226, and an image adjustment element 228, in an embodiment. In an embodiment, system 200 further includes an illumination optics subsystem 216, although this subsystem may be excluded in a system that alternatively includes one or more coherent light sources, as will be described later in more detail. System 200 also may include a storage mechanism (not illustrated) for storing software, which, when executed, results in a method for stabilizing an image to be performed.

Power source 220 may include a mechanism for receiving a continuous source of power, such as, for example, a power cord and a plug. Power source 220 may additionally or alternatively include a mechanism for receiving one or more rechargeable or disposable batteries, in an embodiment. In such an embodiment, power source 220 may enable projection system 220 to be used in a portable manner as a mobile, portable, and/or handheld device.

Image data storage 202 produces the image data, in an embodiment. Image data may take the form of digitized pixel data or other image-describing data, in an embodiment. Image data storage 202 may, for example, include one or more volatile or non-volatile storage devices or storage areas, which may store image data briefly or for extended periods of time. In an embodiment, image data is received over a link 204 to an external source of image data, such as, for example, a computer or a memory component (not illustrated), an inserted memory card (e.g., from a cell phone, camera, etc.), a television signal receiver, a satellite receiver, a cable box, a video player, a DVD player, a digital camera, a digital video cassette recorder, and/or virtually any source of compatible image data, which may be connected to and read by projection system 200 (e.g., a disk, memory cartridge or similar).

The received image data may be temporarily stored or queued for real-time or immediate projection. Alternatively, received image data may be downloaded and stored for projection at a later time. Accordingly, image data storage 202 may include one or more storage mechanisms (e.g., memory caches, registers or similar) within a processor or other device and/or one or more dedicated memory devices (e.g., read only memory (ROM), random access memory (RAM) or similar).

At or near the time of projection, image data 206 may be provided to an imaging pipeline 208. Imaging pipeline 208 includes one or more elements to prepare the received image data 206 for projection, resulting in modified image data 210. For example, but not by way of limitation, an imaging pipeline 208 may include one or more functional elements selected from a group of elements that includes a color adjustment element (e.g., hue or color calibration) and an image shaping element (e.g., keystone correction, width and aspect ratio adjustment, or similar). Imaging pipeline 208 may include more, fewer or different elements, in other embodiments.

For example, in an embodiment, imaging pipeline 208 may be operatively connected to an image adjustment element 228, which is responsive to control inputs generated for the purpose of reducing image obfuscation that may otherwise result from relative movement between a projector and a projected image or a projection surface. For embodiments in which an image adjustment element 228 physically moves an object (e.g., a lens, mirror, modulator, optics element, etc.), image adjustment element 228 may include one or more motors (e.g., stepper motors), gears, connectors, and/or other mechanical elements.

In an embodiment, image adjustment controller 226 provides the control inputs to image adjustment element 228. Image adjustment controller 226 produces the control inputs in response to information received from relative movement detector 222, in an embodiment. In another embodiment, image adjustment controller 226 and/or image adjustment element 228 may consider other information, in addition or alternatively, in determining where and how to adjust an image. Other information may include, for example, distances, orientations, and/or angles between the projection system and a projection surface or image, and/or the projection system's lens settings (e.g., focus, zoom, and shift for optical keystone correction, which may indicate the distance, orientation and/or angle between the projection system and the projection surface or image). Image adjustment, in accordance with an embodiment, is described in more detail later in conjunction with FIG. 11.

Imaging pipeline 208 produces modified image data 210, which is received and consumed by projection subsystem 212. Projection subsystem 212 further receives light produced by a light source 214. Light source 214 may include, for example, a high-pressure mercury bulb or one or more coherent light sources (e.g., lasers), although other sources of light alternatively may be included in system 200.

In an embodiment in which the light source 214 produces non-coherent light, the light 213 produced by light source 214 may be processed by illumination optics subsystem 216, which is interjected between light source 214 and projection subsystem 212, to produce processed light 215. Illumination optics subsystem 216 collects the light 213 produced by light source 214 and directs the processed light 215 toward a light modulator. Illumination optics subsystem 216 may include, for example, one or more reflectors, color filter wheels, color homogenizers, ultra-violet and/or infrared radiation filters, light filters, and/or focusing mechanisms. Illumination optics subsystem 216 may include more, fewer or different elements, in other embodiments.

In various embodiments, projection subsystem 212 includes one or more spatial light modulators, mirrors, lenses, and/or other elements, which will be described in more detail later. A spatial light modulator (not illustrated in FIG. 2) within projection subsystem 212 may adaptively reflect or pass the light 215 that is received from illumination optics subsystem 216 in accordance with the image data 210, in an embodiment. In an alternate embodiment, a modulator may reflect or pass light (e.g., coherent light) that is received directly from a light source (e.g., a coherent light source). The modulator may include, for example, a "DMD" (digital mirror device) modulator, an "LCD" (liquid crystal device) modulator, a coherent light modulator (e.g., a modulator that includes one or more beam steering mirrors), or another type of modulator.

The modulated light from the modulator may produce a "modulated beam," which may be further directed toward and reflected by one or more mirrors (not illustrated in FIG. 2), in an embodiment. Mirrors may be used, for example, to direct a modulated beam in one or more different directions one or more times. In alternate embodiments, projection subsystem 212 may not include any additional mirrors, or may include mirrors placed in other locations within the path between the light source and the projector output.

Ultimately, the modulated beam is received and passed through one or more projection lenses (not illustrated in FIG. 2) within projection subsystem 212, in an embodiment. These lenses may further focus and direct the modulated beam, and ultimately pass an image-containing beam 218 out of the projection system 200 toward a projection surface. In an alternate embodiment, such as an embodiment that includes one or more coherent light sources and one or more coherent light modulators, projection lenses may be excluded from the system, and instead the image-containing beam 218 may pass from the one or more coherent light modulators out of the projection system 200 and toward a projection surface.

In various embodiments, in response to control inputs from image adjustment controller 226, image adjustment element 228 causes one or more elements of the projection system 200 to alter the image-containing beam 218. Image adjustment controller 226 produces the control inputs in response to a detection of relative movement between the projection system 200 and a projected image and/or a projection surface, in an embodiment. Image adjustment element 228 may include a modulator movement mechanism, a mirror movement mechanism, and/or a lens movement mechanism, in various embodiments, which are responsive to control inputs produced by image adjustment controller 226. In alternate embodiments, control inputs from image adjustment controller 226 may additionally or alternatively be received by imaging pipeline 208. Imaging pipeline 208 may alter the image data, in response to the received control inputs.

Image adjustment controller 226 generates the control inputs for the purpose of reducing image obfuscation that may otherwise result from relative movement between a projector and a projected image or a projection surface. In various embodiments, these control inputs are provided by image adjustment controller 226 in response to information received from relative movement detector 222. In another embodiment, image adjustment controller 226, imaging pipeline 208, and/or image adjustment element 228 may consider other information to determine where and how to adjust an image.

Modulator, mirror, and/or lens movement, in accordance with various embodiments, are described in more detail later in conjunction with FIGS. 5–7, 9, and 10. Image adjustment in conjunction with a coherent light type of projector is described in more detail later in conjunction with FIG. 8. Image data alteration, in accordance with various embodiments, is described in more detail later in conjunction with FIG. 11. Image adjustment may be performed using one or multiple image adjustment mechanisms and/or image data alterations, in various embodiments. For example, but not by way of limitation, image adjustment may be achieved by altering image data in conjunction with moving one or more lenses.

As the above description indicates, various embodiments include an apparatus for detecting relative movement of a projection system with respect to a projected image or a projection surface, an element for producing control inputs based on the detected relative movement, and an image adjustment element, which adjusts the projected image based on the control inputs.

Figure 3:
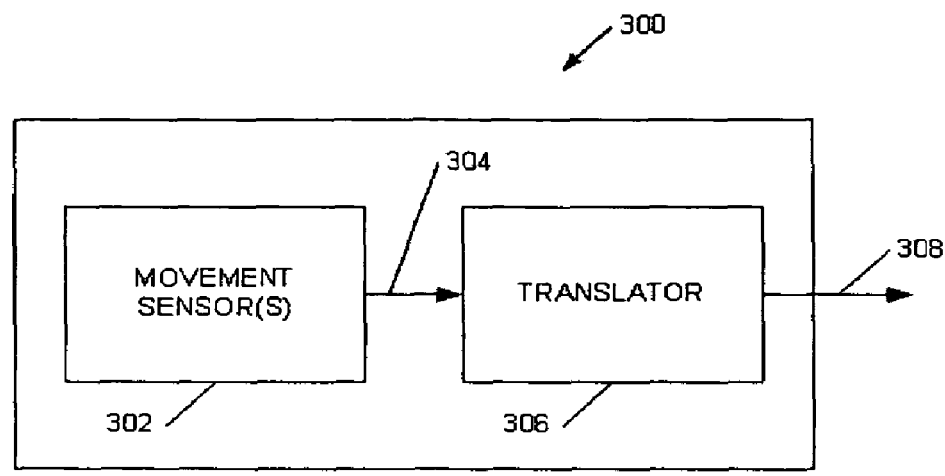
FIG. 3 is a simplified block diagram of a relative movement detector, in accordance with an embodiment.
Figure 4:
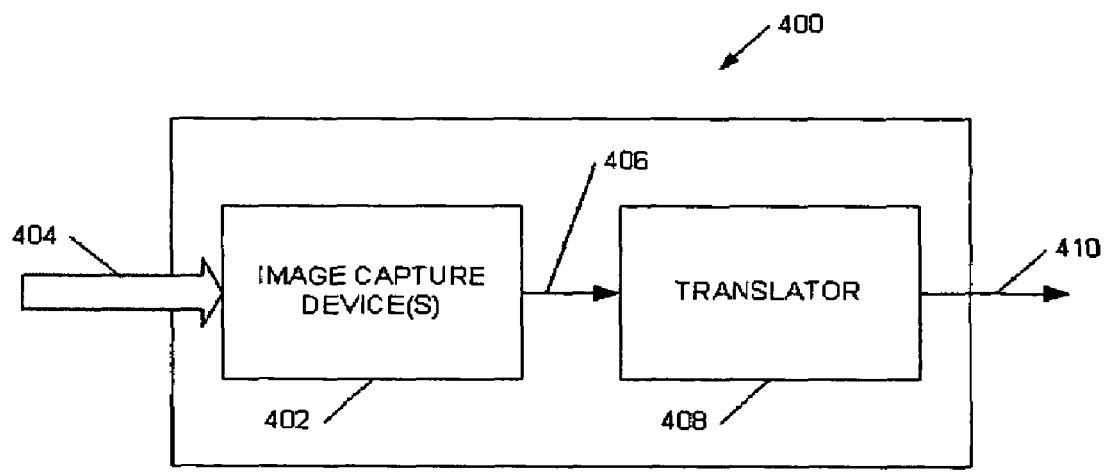
FIG. 4 is a simplified block diagram of a relative movement detector, in accordance with another embodiment.

In FIGS. 3 and 4, described below, two embodiments of relative movement detection apparatus are illustrated. In FIGS. 5–13, described below, various embodiments of image adjustment elements are illustrated. Finally, in FIG. 14, described below, an embodiment of a method for stabilizing a projected image is illustrated.

FIG. 3 is a simplified block diagram of a relative movement detector 300 (e.g., detector 222, FIG. 2), in accordance with an embodiment. Movement detector 300 includes a movement sensor 302 and a translator 306, in an embodiment.

Movement sensor 302 is intended to detect relative movement of the projection system, with respect to a reference object, and to produce sensor outputs 304, which indicate the detected movement. The term "reference object" is meant to include a projected image, a projected reference element, one or more physical objects, or a coordinate system. For example, a reference object may include an image or reference element that is projected by the projector system. Alternatively, a reference object may include one or more physical objects that are proximate to the projector system.

In various embodiments, relative movement may be detected in one, two, or three dimensions by incorporating a movement sensor corresponding to the desired dimensionality of the detected movement. Relative movement may include, for example, vibration, position change, orientation or attitude change, and/or other changes in position with respect to the reference object.

Movement sensor 302 may include, for example, but not by way of limitation, one or more gyroscopes and/or accelerometers, in an embodiment. Various other types of movement sensors may alternatively be used to detect relative movement of the projection system, as would be apparent to those of skill in the art, based on the description herein.

The sensor outputs 304 produced by movement sensor 302 are received by a translator 306, in an embodiment. Translator 306 may translate the sensor outputs 304 into digital or analog movement information 308, which indicates movement with respect to a reference object.

As will be described further in FIGS. 5–13, the movement information 308 may be received by an image adjustment controller (e.g., controller 226, FIG. 2), in an embodiment. In an embodiment, the image adjustment controller analyzes the movement information 308 and produces control signals. These control signals may direct the functioning of one or more image adjustment elements (i.e., mechanisms or processing elements that may cause a projected image to be adjusted in order to mitigate or reduce the effects on the projected image of the detected relative movement).

FIG. 4 is a simplified block diagram of a relative movement detector 400 (e.g., detector 222, FIG. 2), in accordance with another embodiment. Movement detector 400 includes one or more image capture devices 402 and a translator 408, in an embodiment.

Image capture devices 402 are intended to detect relative movement of the projection system with respect to a visible reference object located apart from the projection system, and to produce outputs 404, which indicate the detected movement. In various embodiments, movement may be detected in one, two, or three dimensions by including a number of image capture devices 402 that correspond to the desired dimensionality of the detected movement.

In an embodiment, an image capture device 402 receives visual information 404 from outside of the projection system. For example, an image capture device 402 may receive a reflection of a projected image or projected element (e.g., a point, shape, image edge or edges, or a border). In addition or alternatively, one or more image capture devices 402 may receive reflections from physical objects outside of but in proximity to the projection system (e.g., wall outlets, projection surface features, chair backs, etc.). Detected movement may include, for example, vibration and/or changes in relative position of the projection system with respect to the projected image and/or other objects outside of the projection system.

Various mechanisms may be used to capture outside images or object reflections. For example, but not by way of limitation, one or more cameras or outward-looking motion sensors may be used to visually detect the images or object reflections. Various other types of image capture or other devices may alternatively be used to detect and/or interpret characteristics of the outside images or objects, as would be apparent to those of skill in the art, based on the description herein. For example, but not by way of limitation, one or more distance sensors may be included, which may detect a distance between the projection system and a projection surface or another object. In another embodiment, an auto-focus mechanism may be included, and a distance between the projection system and the projection surface may be inferred from the auto-focus mechanism's settings.

The outputs 406 produced by image capture device(s) 402 are received by a translator 408, in an embodiment. Translator 408 may determine differences between the appearances of the outside images or objects with respect to previously-stored appearances. For example, but not by way of limitation, translator 408 may perform a correlation operation between a previously-stored appearance of a reference object and a more recently-captured appearance. In another embodiment, translator 408 may determine relative differences between two or more reference objects. For example, but not by way of limitation, translator 408 may determine a relative difference between an image border and a wall socket or the border of a projection screen. Based on those differences, translator 408 may translate the outputs 406 into relative movement information 410, which indicates relative movement of the projection system with respect to the reference object. In an embodiment, a user may perform a calibration procedure to initialize an image shape, an image appearance, an image location on a projection surface, or an image location with respect to another reference object.

Again, as will be described further in FIGS. 5–13, the relative movement information 410 may be received by an image adjustment controller (e.g., controller 226, FIG. 2), in an embodiment, which analyses the movement information 410 and produces control signals. These control signals may direct the functioning of one or more image adjustment elements, and/or may be received by an imaging pipeline.

The term "image adjustment" (and similar terms), as used herein, means to adjust the appearance of the image by translation (i.e., moving the image left or right and/or up or down), scaling (i.e., changing the image size and/or zooming), and/or warping (i.e., cause nonuniform scale adjustments to all or parts of the image). For example, in an embodiment, a projection system may be used in an automobile to project images and/or movies onto a seat back screen. The seat back screen may have a bulge or other surface imperfection, which warps the projected image. As the automobile moves, the seat back screen may bounce up and down, thus moving the location of the bulge with respect to the image. In an embodiment, the image may be captured, correlated with a previous image capture, and altered to compensate for the relative movement of the bulge.

Figure 5:
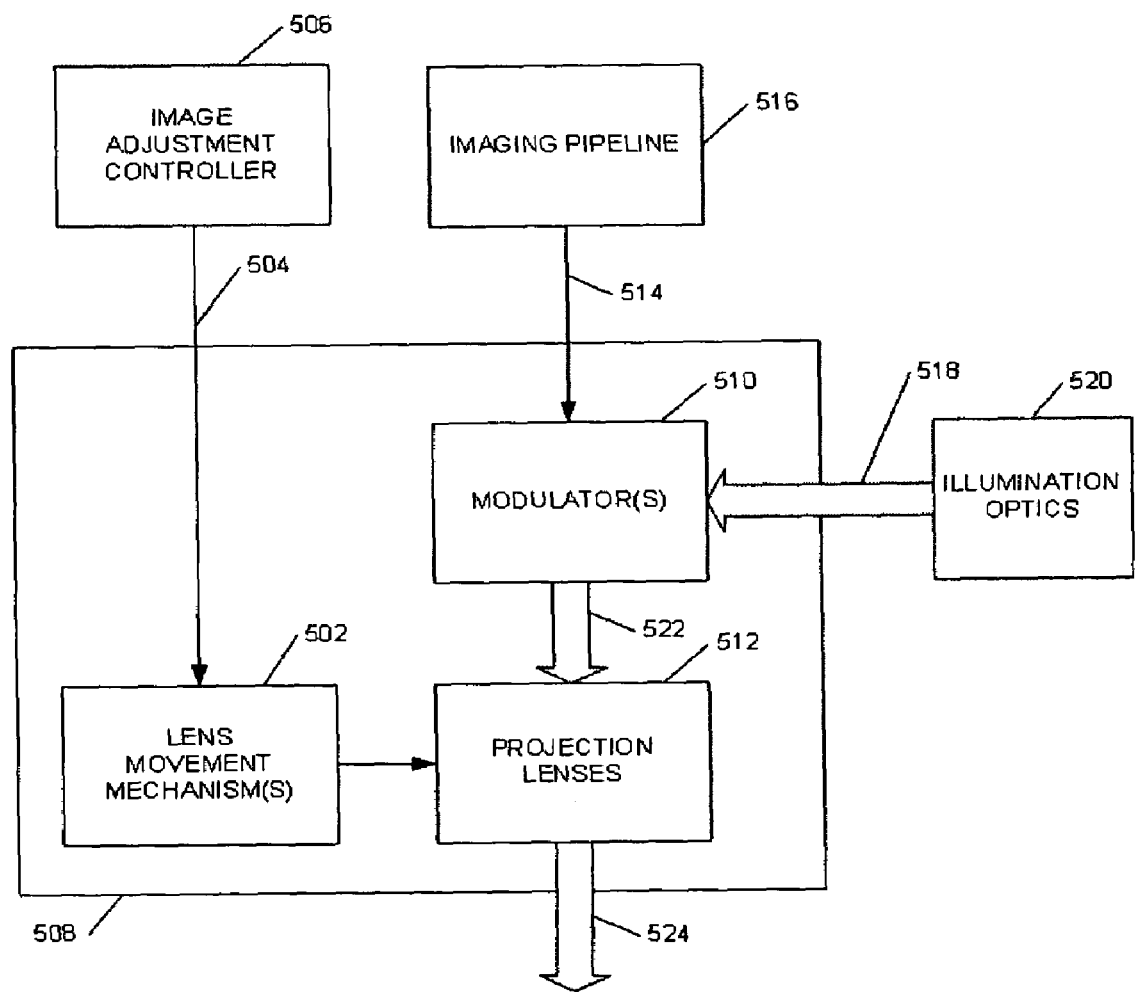
FIG. 5 is a simplified block diagram of a portion of a projection system, which includes a lens movement mechanism, in accordance with an embodiment.

In an embodiment, one type of image adjustment element is a lens movement mechanism, which moves one or more projection lenses. FIG. 5 is a simplified block diagram of a portion of a projection system, which includes a lens movement mechanism 502, in accordance with an embodiment. Lens movement mechanism 502 is an image adjustment element, which achieves adjustment of a projected image by moving one or more projection lenses, in response to control inputs 504 from image adjustment controller 506 (e.g., image adjustment controller 226, FIG. 2).

In an embodiment, lens movement mechanism 502 is included within a projection subsystem 508 (e.g., projection subsystem 212, FIG. 2). Projection subsystem 508 further includes a spatial light modulator 510 and one or more projection lenses 512, in an embodiment.

Modulator 510 may be, for example, a DMD, LCD, coherent light modulator or other type of modulator, as described previously. Modulator 510 receives image data 514 from an imaging pipeline 516 (e.g., imaging pipeline 208, FIG. 2). Modulator 510 also receives processed light 518 from illumination optics 520 (e.g., illumination optics 216, FIG. 2). Based on these inputs 514, 518, modulator 510 projects a beam 522 toward projection lenses 512. Projection lenses 512 may include refractive and/or reflective lenses. The beam passes through and/or is reflected by projection lenses 512, in an embodiment, while being optically transformed by each lens according to the lens size, shape, position and other characteristics. Ultimately, an image-containing beam 524 emerges from projection lenses 512.

In an embodiment, lens movement mechanism 502 receives control inputs 504 from image adjustment controller 506, which indicate how (if at all) lens movement mechanism 502 should move one or more of the projection lenses 512 or lens elements, in order potentially to reduce the effects on the projected image of relative movement between the projection system and the projected image or projection surface. Lens movement mechanism 502 may include a mechanical device, which facilitates lens movement.

Figure 6:
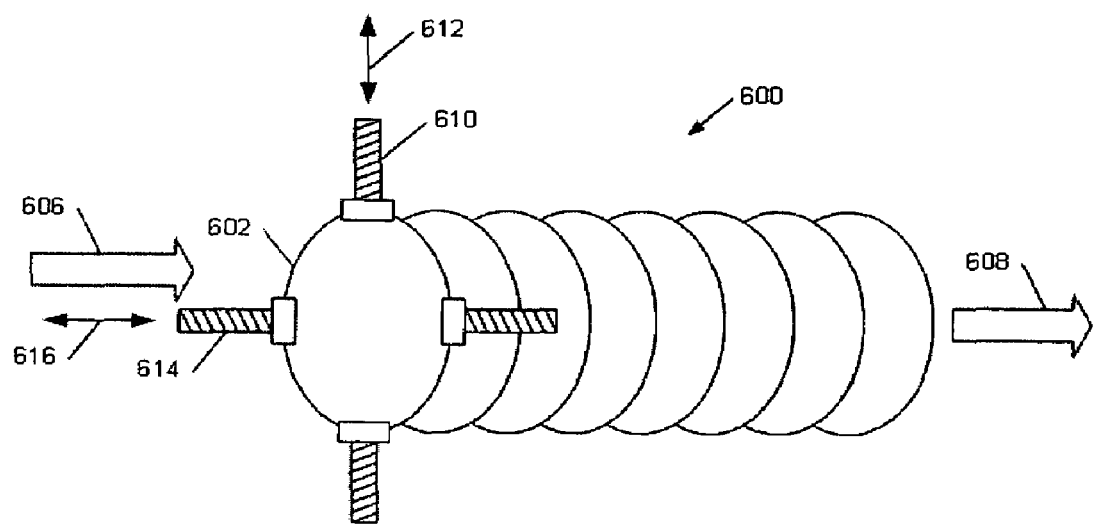
FIG. 6 is a perspective view of a series of projection lenses and a lens movement mechanism, in accordance with an embodiment.
Figure 7:
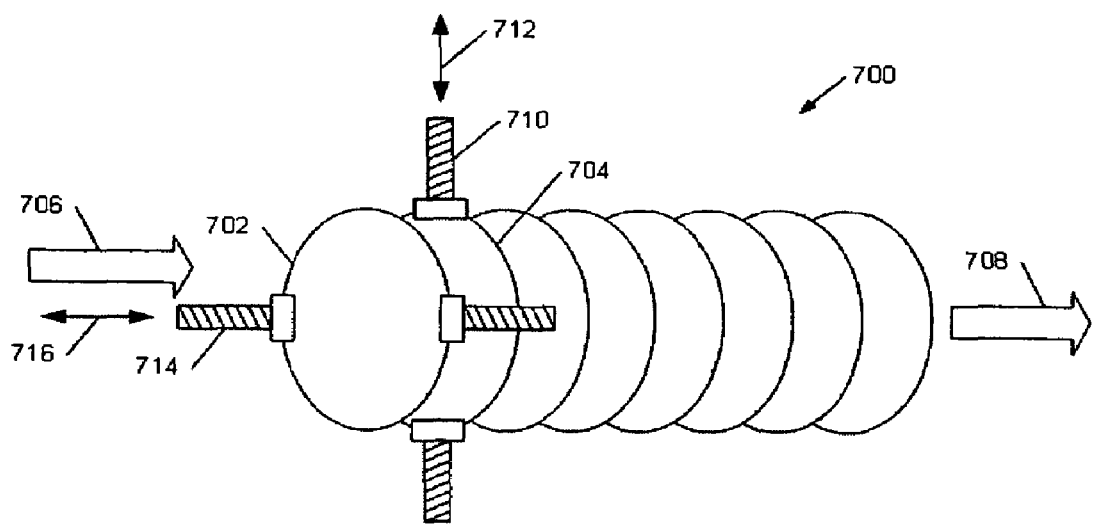
FIG. 7 is a perspective view of a series of projection lenses and a lens movement mechanism, in accordance with another embodiment.

In an embodiment, lens movement mechanism 502 may slide one or more lenses in an x-direction, in a y-direction, in a z-direction, or in a combination of these directions. In another embodiment, lens movement mechanism 502 may pivot and/or rotate one or more lenses around an x-axis, a y-axis, a z-axis, or a combination of these axes. In still another embodiment, lens movement mechanism 502 may produce a combination of sliding, rotating, and/or pivoting one or more lenses. FIGS. 6 and 7 illustrate two embodiments in which a lens movement mechanism 502 may slide one lens (FIG. 6) or two lenses (FIG. 7) in two directions.

FIG. 6 is a perspective view of a series of projection lenses 600 and a lens movement mechanism, in accordance with an embodiment. A series of projection lens elements may include from one to many lenses. In the illustrated embodiment, the series includes eight lenses. More or fewer lenses may be included, in other embodiments.

A beam 606 (e.g., beam 522, FIG. 5) may be directed toward the series of lenses 600. The beam 606 passes through the lenses 600, and an image-containing beam 608 (e.g., beam 524, FIG. 5) emerges from the last lens in the series. Each lens within the series 600 may alter the beam, and the alterations may depend on the size, shape, and location of the lens with respect to the other lenses.

In an embodiment, the relative location or orientation of one or more lenses may be changed, in order to alter the image-containing beam 608. The position alteration is responsive to the detected relative movement between the projection system and the projected image or the projection surface, in an embodiment.

In FIG. 6, a lens movement mechanism may include one or more sliding mechanisms 610, 614. A first mechanism 610 may enable a lens 602 to be slid back and forth along a first direction 612, and a second mechanism 614 may enable the lens 602 to be slid back and forth along a second direction 616. In alternate embodiments, a single mechanism may enable a lens to be slid and/or pivoted along multiple directions and/or axes. In addition or alternatively, a lens may be rotated. A result of moving, pivoting, and/or rotating the lens 602 may be to alter the projected image, and this alteration may reduce the obfuscating effects that may be perceived from relative movement between the projection system and the projected image or the projection surface, in an embodiment.

In another embodiment, multiple lenses in a series may be slid, rotated, and/or pivoted in order to alter the projected image. FIG. 7 is a perspective view of a series of projection lenses 700 and a lens movement mechanism, in accordance with another embodiment.

A beam 706 (e.g., beam 522, FIG. 5) may be directed toward the series of lenses 700. The beam 706 passes through the lenses 700, and an image-containing beam 708 (e.g., beam 524, FIG. 5) emerges from the last lens in the series. As with the example in FIG. 6, each lens within the series 700 may alter the beam, and the alterations may depend on the size, shape, and location of the lens with respect to the other lenses.

In an embodiment, the relative location and/or orientation of two or more lenses may be altered, in order to alter the image-containing beam 708. The lens alteration is responsive to the detected relative movement between the projection system and the projected image or the projection surface, in an embodiment.

In FIG. 7, a first lens movement mechanism may enable a first lens 704 to be slid back and forth along a first direction 712, and a second mechanism 714 may enable a second lens 702 to be slid back and forth along a second direction 716. Moving, rotating, and/or pivoting the lenses 702, 704 may result in altering the projected image, and this alteration may reduce the obfuscating effects that may be perceived from relative movement of the projection system with respect to the projected image and/or the projection surface, in an embodiment.

The examples illustrated in FIGS. 6 and 7 are not meant to be limiting. Instead, it would be apparent to those of skill in the art that one or more projection lenses may be differently moved, rotated or pivoted than the illustrated examples. Further, although the first and/or second lenses within a projection lens series are illustrated to be moved in FIGS. 6 and 7, it would be apparent to one of skill in the art, based on the description herein, that any one or more other lenses could be moved, rotated or pivoted to achieve the same effect. Further, although one lens or two adjacent lenses are shown to be moved, more than two lenses may be moved, rotated, and/or pivoted, or the lenses may not be adjacent (e.g., they may have one or more intermediate lenses). Further, although the examples in FIGS. 6 and 7 illustrate lens movement along two orthogonal directions, lens movement could be performed along more, fewer or different directions, including rotation, which may or may not be orthogonal. Further, lenses could be pivoted around one or more axes and/or rotated, in alternate embodiments. Further still, in alternate embodiments, lenses that are physically distinct from the projection lens series may be used in front of or behind the projection lenses in order to achieve the desired result.

In FIGS. 5–7, image adjustment may be achieved through lens movements, in response to control inputs from image adjustment controller. In an alternate embodiment, as will be described in conjunction with FIG. 8, image adjustment may be achieved in a system that employs one or more coherent light sources (e.g., lasers) by adjusting the operation of the one or more coherent light sources and/or one or more coherent light source modulators.

Figure 8:
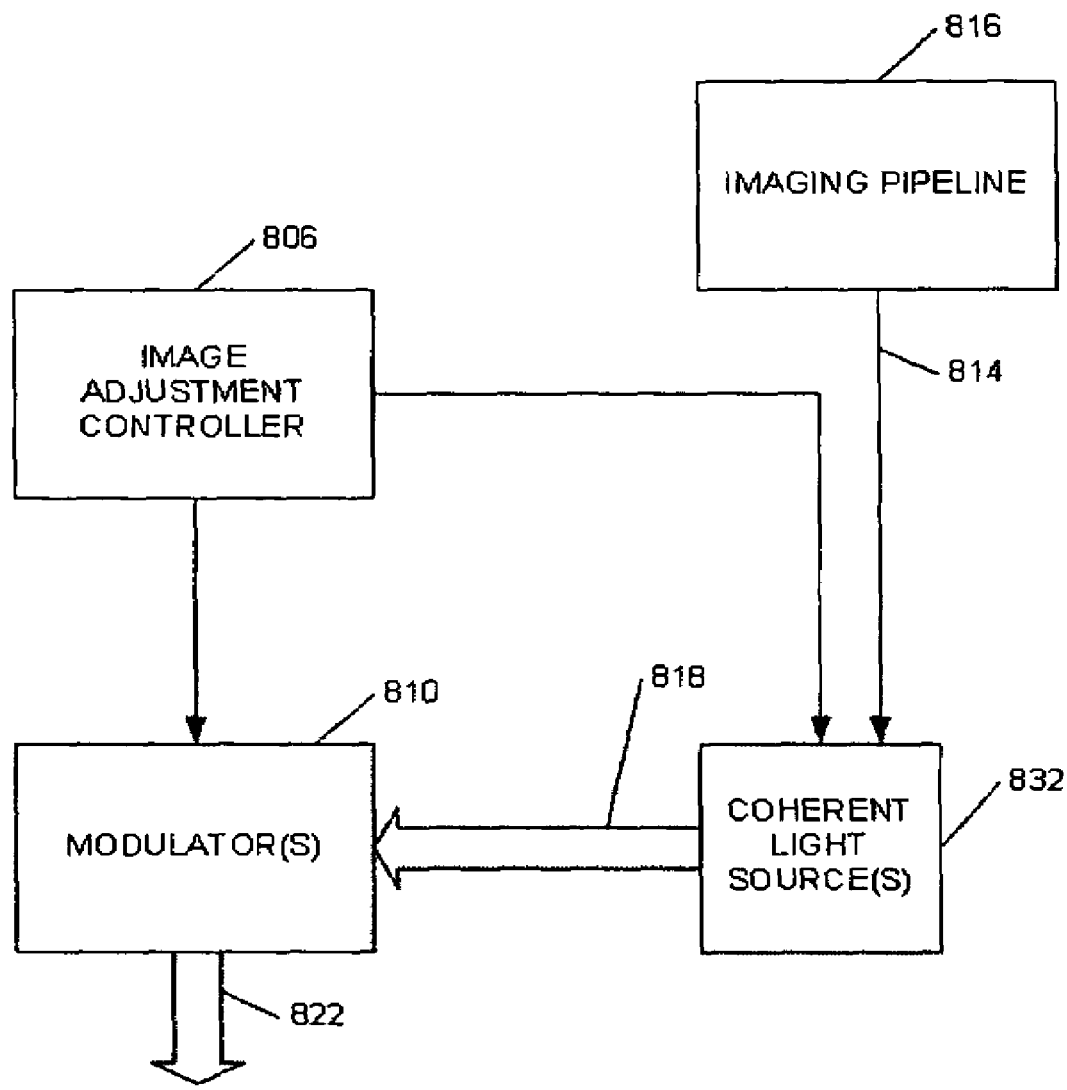
FIG. 8 is a simplified block diagram of a portion of a projection system, which includes an element for altering an image-containing beam produced from one or more coherent light sources, in accordance with an embodiment.

FIG. 8 is a simplified block diagram of a portion of a projection system, which includes an element for altering an image-containing beam produced from one or more coherent light sources, in accordance with an example embodiment. In such a projection system, one or more coherent light sources 832 produce one or more coherent light beams 818 (e.g., laser beams).

In an embodiment, each light beam 818 may be received by a coherent light modulator 810, which may include beam steering optics (e.g., a mirror). A coherent light modulator 810 (e.g., including a mirror) reflects a beam 822 out of the projection system. In an embodiment, coherent light modulator 810 rapidly moves back and forth and up and down (e.g., in a raster pattern), which causes the angle that beam 822 exits the projection system to change. In an embodiment, the beam 822 is scanned extremely rapidly, causing a perception that the beam 822 is continuously projected over an area (e.g., a rectangular image area). As the beam 822 is scanned out, coherent light source 832 also rapidly varies its intensity according to image data received from imaging pipeline 816. This causes variations in the lightness of the beam at selected locations within the scanned area. This may result in a perceived projected image.

In an embodiment that includes a single coherent light source (e.g., a red laser), a monochrome projected image may be produced in this manner. In an embodiment that includes multiple coherent light sources (e.g., red, green, and blue lasers) and multiple beam steering elements (e.g., mirrors), a color projected image may be produced from the blended perception of the multiple colors. Although a beam 822 projected from the projection system at any instant of time may only be composed of from one to several laser beams, which may not at that instant form a perceptible image, the term "image-containing beam" is meant to apply also to embodiments that use coherent light. In such embodiments, the image-containing beam has a temporal aspect, meaning that it includes a set of beam outputs that are distributed over a continuous period of time (e.g., the amount of time for a beam to be scanned over a raster pattern one time).

In an embodiment, an image adjustment controller 806 may adjust an image-containing beam 822 in multiple ways, when relative movement is detected. For example, image adjustment controller 806 may send control inputs to imaging pipeline 816, which may, in turn, modify the imaging data. The one or more coherent light sources 832 may modify the intensities of their lasers differently to compensate for relative movement, based on the modified image data.

Image adjustment controller 806 also may send control inputs to one or more coherent light modulators 810. For example, the control inputs may cause one or more coherent light modulators 810 to scan the image over a larger area (e.g., if the relative distance between the projection system and the projected image becomes smaller), or to direct the image out of the projection system at a different angle.

In FIG. 8, image adjustment may be achieved through variable control of one or more coherent light sources and/or one or more coherent light source modulators, in response to control inputs from image adjustment controller. In an alternate embodiment, as will be described in conjunction with FIG. 9, image adjustment may be achieved through movement of one or more mirrors. Accordingly, an alternate embodiment, another type of image adjustment element is a mirror movement mechanism, which moves one or more mirrors within the projection system.

Figure 9:
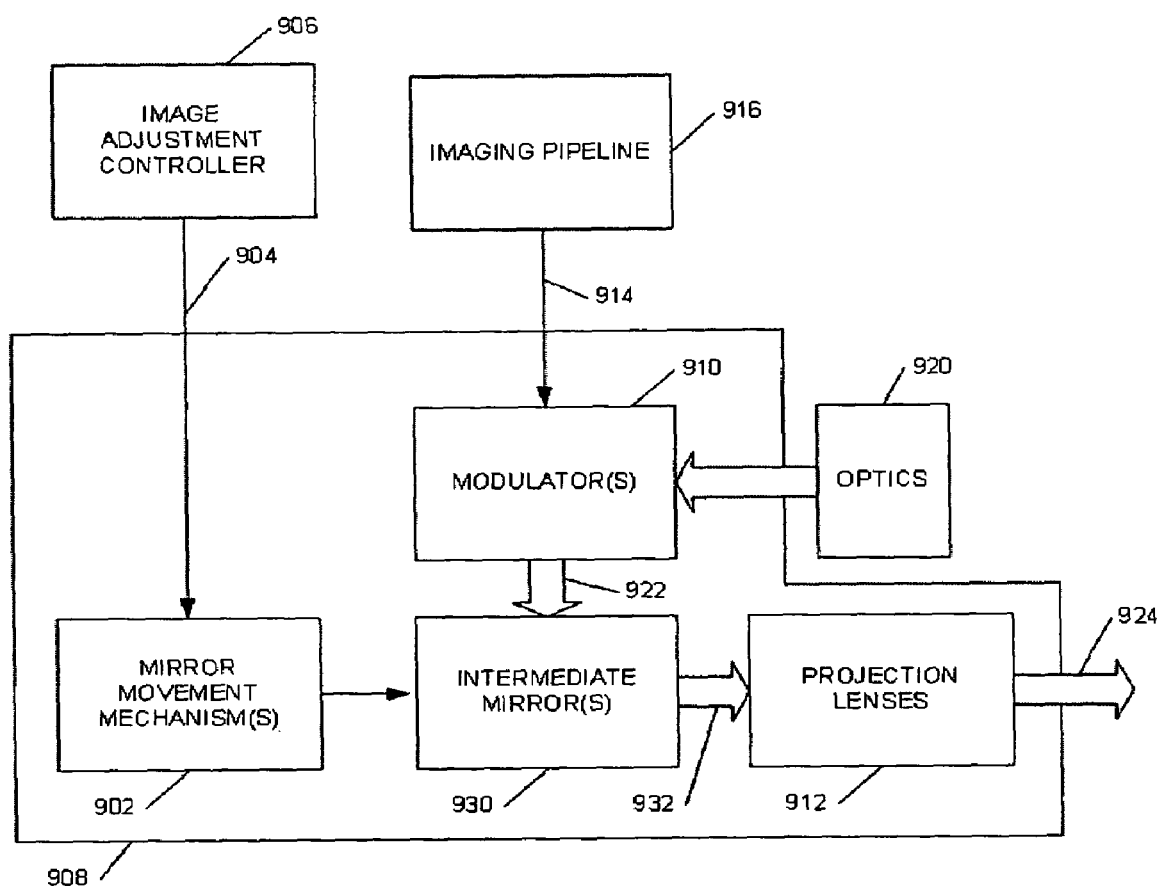
FIG. 9 is a simplified block diagram of a portion of a projection system, which includes a mirror movement mechanism, in accordance with an embodiment.

FIG. 9 is a simplified block diagram of a portion of a projection system, which includes a mirror movement mechanism 902, in accordance with an embodiment. Mirror movement mechanism 902 is an image adjustment element, which achieves adjustment of a projected image by moving one or more mirrors, in response to control inputs 904 from image adjustment controller 906 (e.g., image adjustment controller 226, FIG. 2). In various embodiments, one or more optical elements (e.g., lenses, not illustrated) may be positioned between modulator 910 and intermediate mirror(s) 930. The mirror(s) may also be downstream of the projection lens 912, in various embodiments.

In an embodiment, mirror movement mechanism 902 is included within a projection subsystem 908 (e.g., projection subsystem 212, FIG. 2). Projection subsystem 908 further includes a modulator 910 and one or more projection lenses 912, in an embodiment.

Modulator 910 may be, for example, a DMD, LCD, coherent light modulator or other type of modulator, as described previously. Modulator 910 receives image data 914 from an imaging pipeline 916 (e.g., imaging pipeline 208, FIG. 2). Modulator 910 also may receive processed light 918 from illumination optics 920 (e.g., illumination optics 216, FIG. 2). Based on these inputs 914, 918, modulator 910 may project an internal image-containing beam 922 toward one or more intermediate mirrors 930.

Mirrors 930 may serve any one or more of several purposes, in various embodiments. For example, but not by way of limitation, mirrors 930 may serve to alter the position of a projected image, based on detected relative movement between the projection system and the projected image or the projection surface. Further, in various embodiments, mirrors 930 may serve to re-direct internal beam 922 at a different angle one or more times, to produce a reflected beam 932.

In an embodiment, mirror movement mechanism 902 receives control inputs 904 from image adjustment controller 906, which indicate how (if at all) mirror movement mechanism 902 should move one or more of mirrors 930, in order potentially to reduce the effects on the projected image of relative movement between the projection system and the projected image or projection surface. Mirror movement mechanism 902 may include a mechanical device, which facilitates mirror movement.

In an embodiment, mirror movement mechanism 902 may slide one or more mirrors in an x-direction, in a y-direction, in a z-direction, or in a combination of these directions. In another embodiment, mirror movement mechanism 902 may pivot one or more mirrors around an x-axis, a y-axis, a z-axis, or a combination of these axes. In still another embodiment, mirror movement mechanism 902 may both slide and pivot one or more mirrors.

Mirrors 930 direct reflected beam 932 toward projection lenses 912. The beam passes through and/or is reflected by projection lenses 912, while being optically transformed by each lens. A result of the mirror movements is to alter a direction that reflected beam 932 enters projection lenses 912. Accordingly, an external image-containing beam 924 emerges from projection lenses 912 and lands or impinges on the projection surface in a different, position, warp, scale or focus.

In FIG. 9, image adjustment may be achieved through mirror movements, in response to control inputs from image adjustment controller. In an alternate embodiment, as will be described in conjunction with FIG. 10, image adjustment may be achieved through movement of one or more modulators. Accordingly, an alternate embodiment, another type of image adjustment element is a modulator movement mechanism, which moves a modulator within the projection system.

Figure 10:
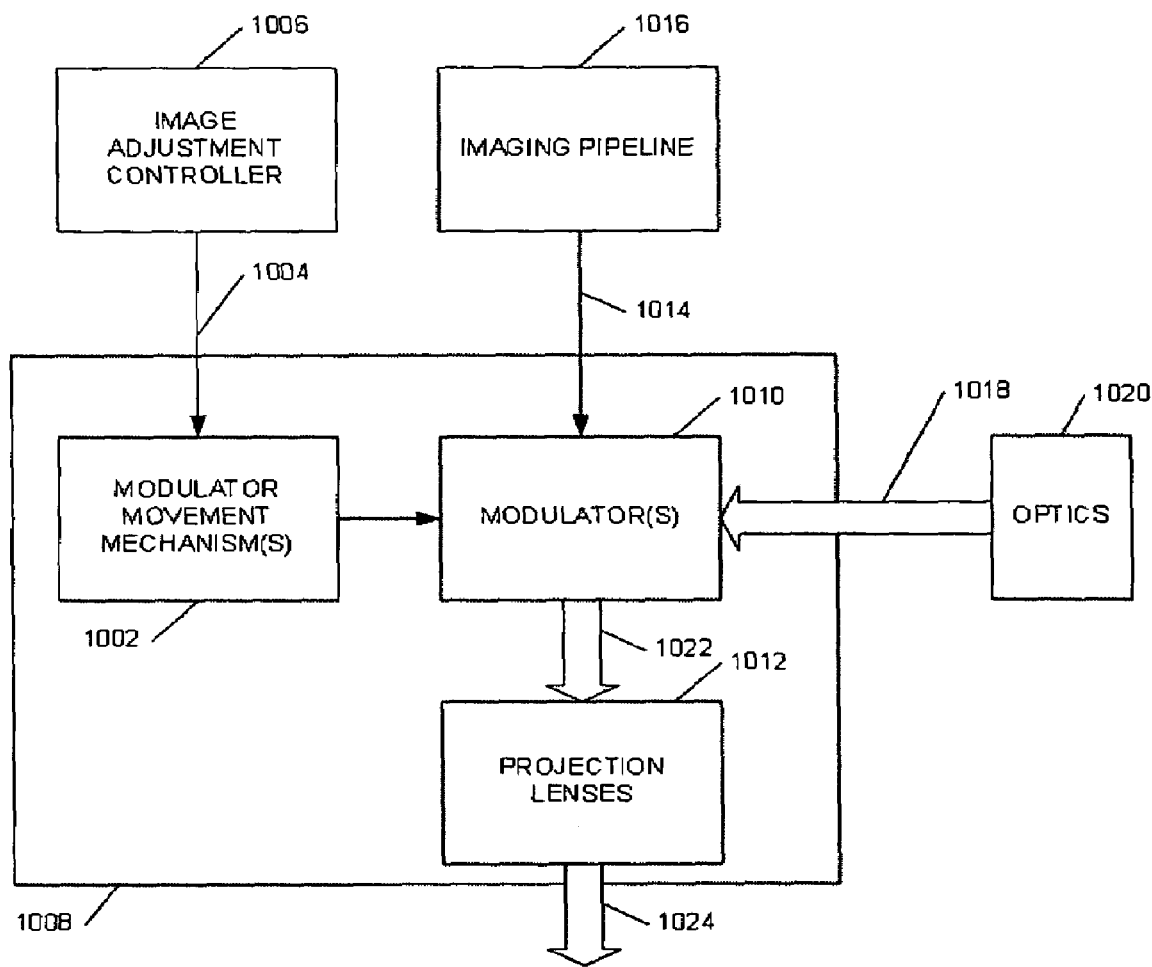
FIG. 10 is a simplified block diagram of a portion of a projection system, which includes a modulator movement mechanism, in accordance with an embodiment.

FIG. 10 is a simplified block diagram of a portion of a projection system, which includes one or more modulator movement mechanisms 1002, in accordance with an embodiment. A modulator movement mechanism 1002 is an image adjustment element, which achieves adjustment of a projected image by moving one or more modulators, in response to control inputs 1004 from image adjustment controller 1006 (e.g., image adjustment controller 226, FIG. 2).

In an embodiment, one or more modulator movement mechanisms 1002 are included within a projection subsystem 1008 (e.g., projection subsystem 212, FIG. 2). Projection subsystem 1008 further may include one or more projection lenses 1012, in an embodiment.

System 1000 further includes one or more modulators 1010. A modulator 1010 may include, for example, a DMD, LCD, coherent light modulator or other type of modulator, as described previously. The term "modulator" may be used in a singular sense, in the description. However, it is to be understood that a "modulator" may actually include multiple modulator elements or separate modulators, which may be controlled or moved separately or as a group. For example, but not by way of limitation, an LCD modulator or a coherent light modulator may actually include from one to three (or more) modulator elements or separate modulators. For monochrome image projection, a single modulator element may suffice. For projecting an image that includes a blend of red, green and blue light, multiple (e.g., three) modulator elements may be included. In embodiments that include multiple modulators or modulator elements, each one may produce a beam which, when combined, may result in multiple-color image-containing beam 1024. In a system that includes multiple modulators, illumination optics may be replicated for each modulator.

Modulator 1010 receives image data 1014 from an imaging pipeline 1016 (e.g., imaging pipeline 208, FIG. 2). Modulator 1010 also receives processed light 1018 from illumination optics 1020 (e.g., illumination optics 216, FIG.

2). Based on these inputs 1014, 1018, modulator 1010 projects a beam 1022 toward projection lenses 1012. The beam passes through and/or is reflected by projection lenses 1012, while being optically transformed by each lens. Ultimately, an image-containing beam 1024 emerges from projection lenses 1012.

In an embodiment, modulator movement mechanism 1002 receives control inputs 1004 from image adjustment controller 1006, which indicate how (if at all) modulator movement mechanism 1002 should move modulator 1010, in order potentially to reduce the effects on the projected image of relative movement between the projection system and the projected image or projection surface. Again, although modulator movement mechanism 1002 and modulator 1010 are used in the singular sense, herein, multiple modulator movement mechanisms 1002 and/or modulators 1010 may be included, in various embodiments. Modulator movement mechanism 1002 may include a mechanical device, which facilitates modulator movement.

In an embodiment, modulator movement mechanism 1002 may slide modulator 1010 in an x-direction, in a y-direction, in a z-direction, or in a combination of these directions. In other embodiments, modulator movement mechanism 1002 may pivot and/or rotate modulator 1010 around an x-axis, a y-axis, a z-axis, or a combination of these axes. In still another embodiment, modulator movement mechanism 1002 may produce a combination of sliding, pivoting, and/or rotation of modulator 1010.

A result of these movements is to alter a direction that light beam 1022 is focused toward projection lenses 1012. By altering the direction that modulator beam 1022 enters projection lenses 1012, the image-containing beam 1024 emerges from projection lenses 1012 in an altered state, and lands or impinges on the projection surface in a different, position, warp, scale or focus.

In FIG. 10, image adjustment may be achieved through modulator movements, in response to control inputs from image adjustment controller. In an alternate embodiment, image adjustment may be achieved in the digital domain through alteration of the image data, as will be described in conjunction with FIG. 11. Accordingly, an alternate embodiment, another type of image adjustment element is an image data alteration element, which modifies the image data.

Figure 11:
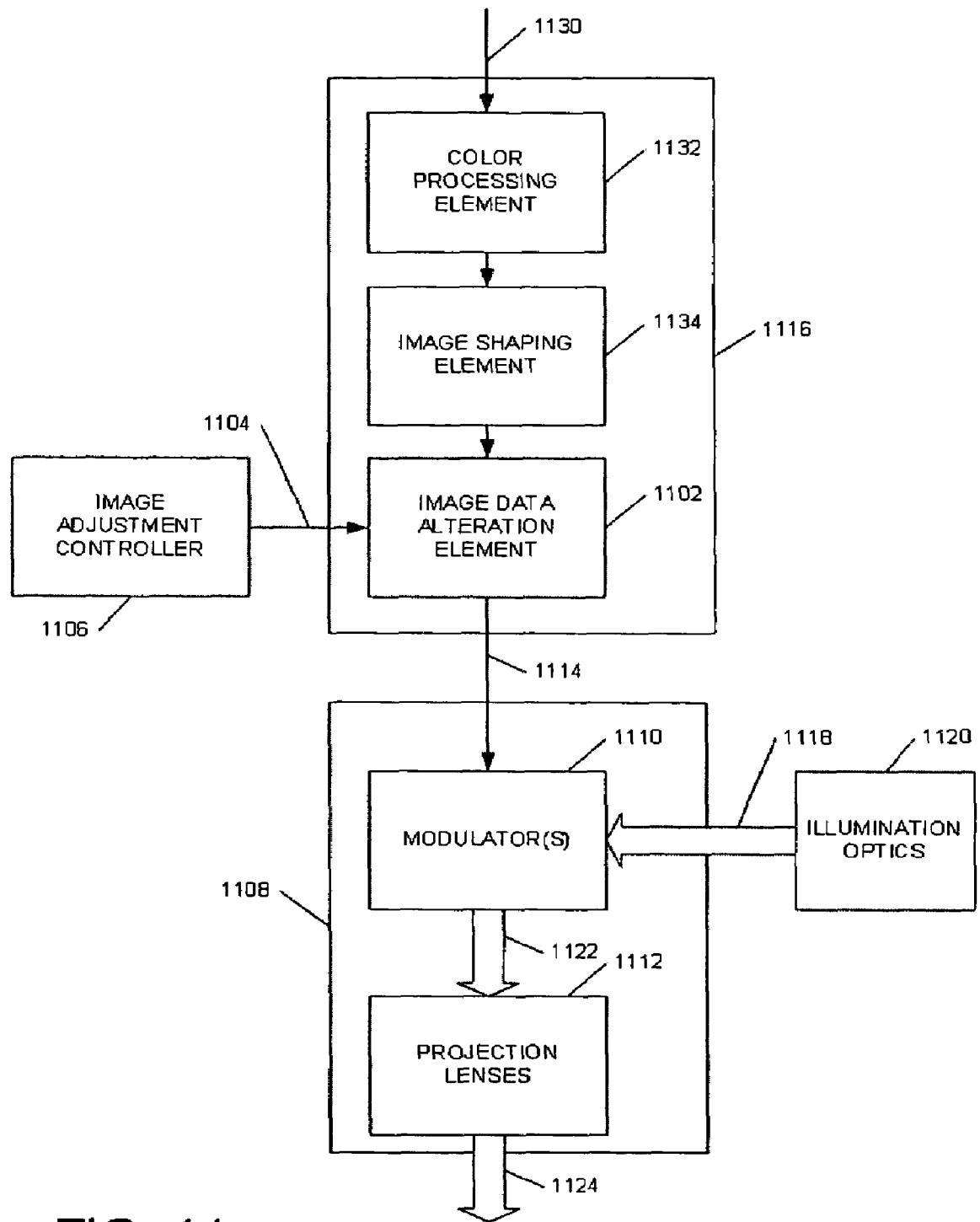
FIG. 11 is a simplified block diagram of a portion of a projection system, which includes an element for digitally altering an image, in accordance with an embodiment.

FIG. 11 is a simplified block diagram of a portion of a projection system, which includes an element 1102 for digitally altering an image, in accordance with an embodiment. Image data alteration element 1102 is an image adjustment element, which achieves adjustment of a projected image by digitally translating, warping, or scaling image data, in response to control inputs 1104 from image adjustment controller 1106 (e.g., image adjustment controller 226, FIG. 2).

In an embodiment, image data alteration element 1102 is included within an imaging pipeline 1116 (e.g., imaging pipeline 208, FIG. 2). Imaging pipeline 1116 may further include, for example, one or more other processing elements, such as color processing element 1132, and image shaping element 1134, which process received image data 1130 (e.g., image data 206, FIG. 2). Imaging pipeline 1116 may include more, fewer or different elements, in other embodiments. Further, the order of color processing element 1132, image shaping element 1134, and image data alteration element 1102 may be different from that illustrated in FIG. 11.

Imaging pipeline 1116 produces processed image data 1114, which is provided to modulator 1110 of a projection subsystem 1108 (e.g., subsystem 212, FIG. 2). Modulator 1110 also receives a processed light beam 1118 from illumination optics 1120 (e.g., illumination optics 216, FIG. 2). Modulator 1110 uses those inputs 1114, 1118 to produce a modulated beam 1122, which is projected toward projection lenses 1112.

In an embodiment, image data alteration element 1102 receives control inputs 1104 from image adjustment controller 1106, which indicate how (if at all) image data alteration element 1102 should alter the image data, in order potentially to reduce the effects on the projected image of relative movement between the projection system and the projected image or projection surface. In an embodiment, image data alteration element 1102 produces the effect of transforming the relative positions of the pixels represented within the image data. For example, image data alteration element 1102 may translate (i.e., slide), warp (i.e., distort), and/or scale (i.e., make larger or smaller) all or portions of an image. This effectively moves one or more portions of an image from one to many pixel positions left or right and/or up or down. Accordingly, image data alteration element 1102 effectively may translate portions an image by one or more pixels in an x-direction, in a y-direction, or in a combination of these directions. In various embodiments, portions of an image may be moved in the same direction, in different directions, or left unmoved, depending on whether the image is being translated, warped, scaled, or any combination of these effects.

A result of these digital pixel transformations (i.e., translations, warping, scaling, or combinations thereof) is to alter operation of modulator 1110, which will interpret some or all of the pixels differently from how they would have been interpreted without transformation. By altering the operation of modulator 1110, the locations that some or all pixels represented within modulator beam 1122 enter projection lenses 1112 are also changed. Accordingly, all or portions of the image-containing beam 1124 emerge from projection lenses 1112 in an altered state, and lands or impinges on the projection surface in a different, position, warp, scale or focus.

The Figures previously described illustrate that there are multiple ways to adjust an image based on detected relative movement between a projection system and a projected image or a projection surface. The above examples are not meant to be limiting, and it would be apparent to one of skill in the art, based on the description herein, how other elements of a projection system may be moved or otherwise have their operations altered in order to adjust the image.

A projected image could be altered in a variety of ways in order to reduce image obfuscation. In an embodiment, an image is projected within a portion of an image field, and the image may be moved around within that image field in order to mitigate the effects of projection system movement relative to the projected image and/or the projection surface.

Figure 12:
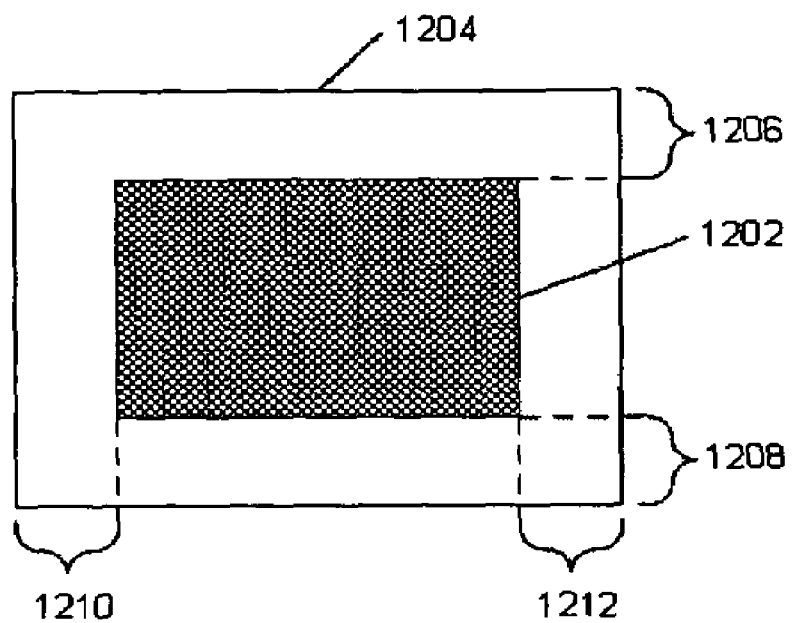
FIG. 12 is a conceptual diagram illustrating a projected image centered within an image field on a projection surface, in accordance with an embodiment.

FIG. 12 is a conceptual diagram illustrating a projected image 1202 centered within an image field 1204 on a projection surface, in accordance with an embodiment. Image field 1204 represents an area within which a projection system may project an image.

In an embodiment, the actual image size is less than the image field size. Accordingly, when a projected image 1202 is centered within the image field 1204, a top portion and a bottom portion of the image field's height are unused, and the heights 1206, 1208 of those portions may be approximately equal to each other. Similarly, a left portion and a right portion of the image field's width are also unused, and the widths 1210, 1212 of those portions also may be approximately equal to each other. In various embodiments, a projected image may be moved around (as described previously) within the image field 1202 in order to reduce the obfuscating effects of relative movement between the projection system and the projected image or the projection surface.

Figure 13:
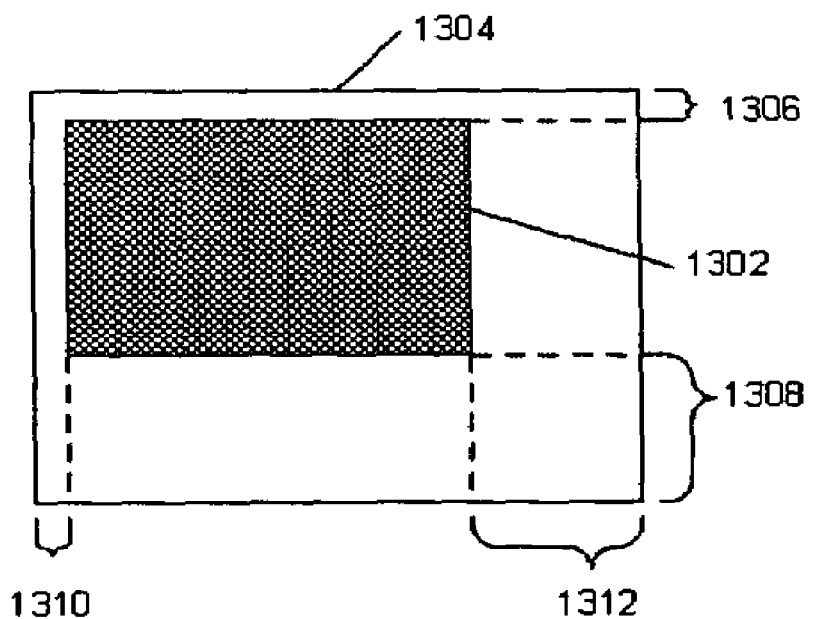
FIG. 13 is a conceptual diagram illustrating an off-center, projected image within an image field on a projection surface, in accordance with an embodiment.

FIG. 13 is a conceptual diagram illustrating an image 1302 off-center within an image field 1304, in accordance with an embodiment. Again, image field 1304 represents an area within which a projection system may project an image.

When a projected image 1302 is off-center within the image field 1304, a top portion and/or a bottom portion of the image field's height may be unused, and the heights 1306, 1308 of those portions may not equal each other. Similarly, a left portion and a right portion of the image field's width may also be unused, and the widths 1310, 1312 of those portions also may not equal each other. FIG. 13 illustrates an image 1302 that may have been moved from a centered position (e.g., as in FIG. 12) in order to reduce the obfuscating effects of relative movement between the projection system and the projected image and/or the projection surface.

Besides altering an image in a planar sense (e.g., across a relatively flat projection surface), embodiments may be used to focus an image closer or farther, based on projection system movements. Further, embodiments may be used to "tilt" or otherwise distort the image (e.g., to focus one edge or corner of the image closer than another edge or corner, or to keystone the image), in order to compensate for relative movement between the projection system and the projected image and/or the projection surface.

Several embodiments of apparatus have been described, above, which may be used in conjunction with a projection system. Various procedural processes occur in order for the various described apparatus to achieve the desired effect of reducing relative-movement-induced image obfuscation.

Figure 14:
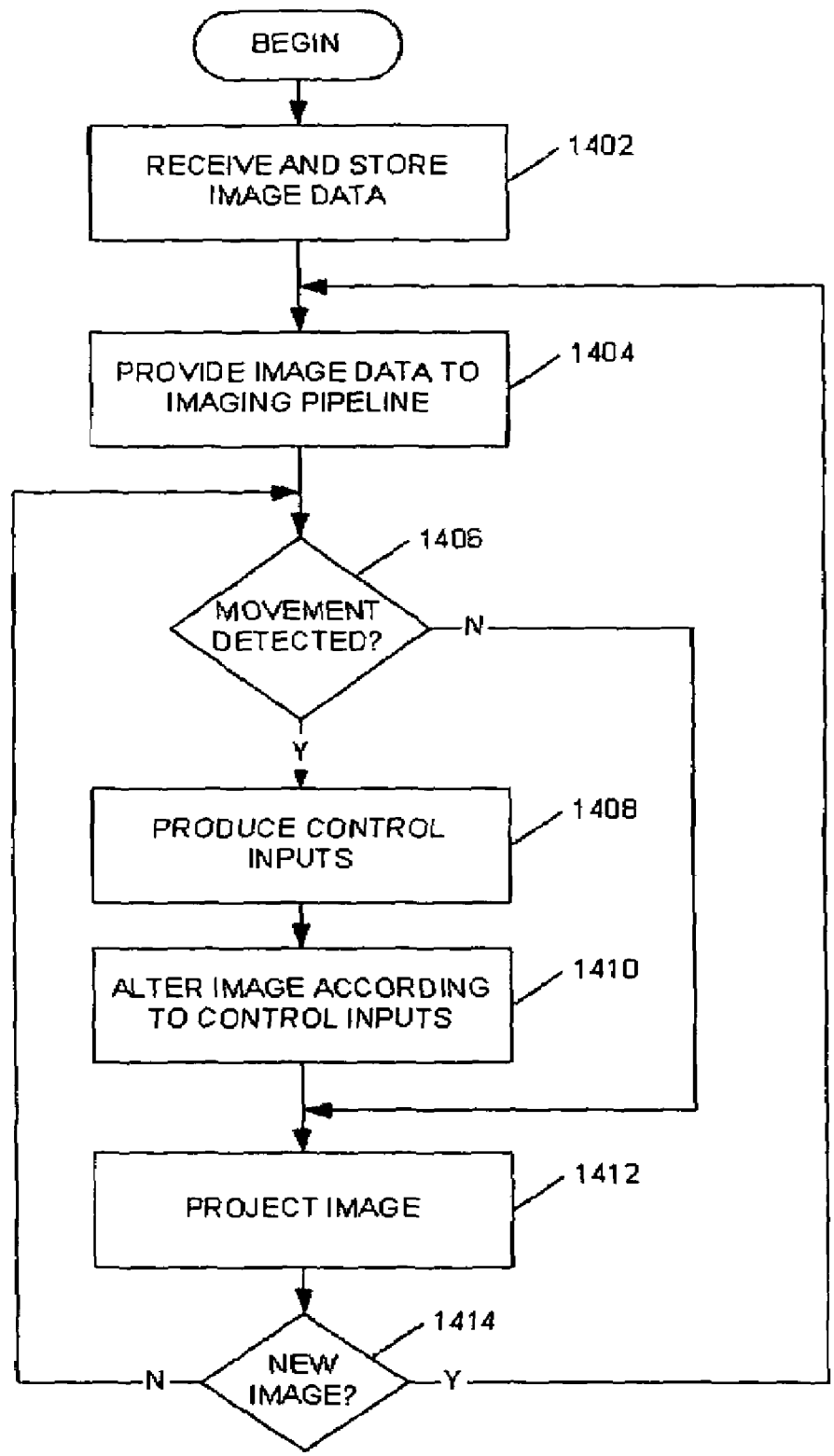
FIG. 14 is a flowchart of a method for stabilizing a projected image, in accordance with an embodiment.

FIG. 14 is a flowchart of a method for stabilizing a projected image, in accordance with an embodiment. The method begins, in block 1402, by the projection system receiving image data. In an embodiment, image data may be received from a computer or other device over a wired or wireless link with the projection system. Alternatively, image data may be received from any of a variety of storage media connectable with the projection system.

The received image data may be stored (e.g., in image data storage 202, FIG. 2). The image data may be stored for a short period of time or for a long period of time, in various embodiments. For example, if the received image data is to be displayed in immediately or in real-time, then the data may only be queued and/or cached for a short period of time. Alternatively, if the received image data is to be displayed at a later time, it may be downloaded and stored within the projection system.

In block 1404, image data corresponding to a particular image is provided to the imaging pipeline (e.g., imaging pipeline 208, FIG. 2). Once provided to the pipeline, the image data will be processed, and ultimately an image corresponding to the data will be projected.

In block 1406, a determination is made whether substantial relative movement of the projection system has been detected by one or more movement detectors, which may be self-contained within the projection system. Relative movement includes projection system displacement or attitude change with respect to one or more reference objects, including physical objects, a projected image, a projection surface, and/or one or more other objects external to the projection system. Relative movement may be considered substantial enough to be "detected" if the magnitude, speed or frequency of the relative distance, orientation, or angle between the projector system and the reference object has reached or exceeded a threshold.

If relative movement is detected, then the relative movement detector produces movement information indicating that the relative movement has occurred. In an embodiment, the movement detector also may provide other information about the characteristics of the movement (e.g., magnitude, direction, frequency, angle, etc.). In an embodiment, a movement detector produces an interrupt when substantial movement is detected. In another embodiment, a movement detector continuously or periodically produces an output that enables image adjustment controller to determine whether or not movement has occurred.

The movement information is received by an image adjustment controller, in an embodiment. The image adjustment controller produces control inputs, in block 1408, based on the movement detector outputs. The control inputs include information to alter the operation of one or more image adjustment elements in order to reduce the effects of relative movement between the projector system movement and the projected image or the projection surface.

The control inputs are received by the one or more image adjustment elements. In block 1410, the one or more image adjustment elements may use information within the control inputs to alter or adjust the projected image. An image adjustment element may perform one or more of a variety of actions, including moving or altering operations for one or more physical elements of the projection system, and/or altering the image data to effectively alter all or portions of the projected image. Because an image may or may not be altered, at a given time, it is referred to below as a "potentially-altered" image.

In block 1412, the potentially-adjusted image is projected by the projection system. In block 1414, a determination is made whether a new image (or a new portion of a currently displayed image) is to be projected. If not, then the method iterates as shown, while continuing to project the current image. If so, then the image data corresponding to the new image (or portion thereof), is provided to the imaging pipeline, and the process continues. Eventually, a user may terminate the projection session, for example, by turning the projector off.

Although the FIG. 14 illustrates various processes as occurring in a specific sequence, it would be apparent to one of skill in the art that the order of the process blocks could be modified while still achieving the same results. Accordingly, modifications in the sequence of processing blocks are intended to fall within the scope of the inventive subject matter.

The various procedures described herein can be implemented in combinations of hardware, firmware, and/or software. Portions implemented in software could use microcode, assembly language code or a higher-level language code. The code may be stored on one or more volatile or non-volatile computer-readable media during execution or at other times. These computer-readable media may include hard disks, removable magnetic disks, removable optical disks, magnetic cartridges or cassettes, flash memory cards, digital video disks, Bernoulli cartridges, RAMs, ROMs, and the like.

Thus, various embodiments of a method, apparatus, and system have been described which enable a projected image to be stabilized in the presence of relative movement between the projection system and the projected image and/or the projection surface. The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments.

The phraseology or terminology employed herein is for the purpose of description and not of limitation. Accordingly, the inventive subject matter embraces all such alternatives, modifications, equivalents and variations as fall within the spirit and broad scope of the appended claims.

What is claimed is:

1. An apparatus comprising:
    a projection subsystem to project an image-containing beam, resulting in a projected image;
    an image adjustment element to cause adjustment of the image-containing beam in response to a detection of relative movement between the apparatus and a reference object;
    a relative movement detector to detect the relative movement, and further to produce movement information indicating the relative movement; and
    a controller to produce control inputs, in response to the movement information, to control operations of the image adjustment element that includes a mirror movement mechanism to move one or more mirrors in response to the control inputs.

2. The apparatus of claim 1, wherein the apparatus further comprises:
    a relative movement detector to detect the relative movement between the apparatus and the reference object, and further to produce movement information indicating the relative movement.

3. The apparatus of claim 1, wherein the reference object includes the projected image.

4. The apparatus of claim 1, wherein the image adjustment element comprises:
    a lens movement mechanism to move one or more lenses of the projection subsystem in response to the control inputs.

5. The apparatus of claim 1, wherein the image adjustment element comprises:
    a coherent light modulator to output an image based on the control inputs.

6. The apparatus of claim 1, wherein the image adjustment element comprises:
    a modulator movement mechanism to move one or more modulators in response to the control inputs.

7. The apparatus of claim 1, wherein the image adjustment element comprises:
    an image data alteration element to modify image data in response to the control inputs.

8. The apparatus of claim 1, further comprising:
    a mechanism for receiving one or more batteries to enable the apparatus to is be used in a portable device.

9. A projection system comprising:
    a relative movement detector to detect relative movement between the projection system and a reference object and to produce movement information;
    a controller, operatively coupled to the movement detector, to produce control inputs, in response to the movement information;
    an imaging pipeline to prepare image data for projection based on the control inputs, resulting in modified image data;
    one or more coherent light sources to output one or more coherent light beams having time-varying intensities, based on the modified image data; and
    a coherent light modulator to scan the one or more coherent light beams out of the projection system.

10. A projection system comprising:
    a relative movement detector to detect relative movement between the is projection system and a reference object and to produce movement information;
    a controller, operatively coupled to the movement detector, to produce control inputs, in response to the movement information;
    an imaging pipeline to prepare image data for projection, resulting in modified image data;
    one or more coherent light sources to output one or more coherent light beams having time-varying intensities, based on the modified image data; and
    a coherent light modulator to scan the one or more coherent light beams out of the projection system, based on the control inputs.

11. A projection system comprising:
    a relative movement detector to detect relative movement between the projection system and a reference object and to produce movement information;
    a controller, operatively coupled to the movement detector, to produce control inputs, in response to the movement information;
    an imaging pipeline to prepare image data for projection based on the control inputs, resulting in modified image data;
    one or more coherent light sources to output one or more coherent light beams having time-varying intensities, based on the modified image data; and
    a coherent light modulator to scan the one or more coherent light beams out of the projection system, based on the control inputs.

12. A projection system comprising:
    a modulator to receive light and image data, and further to produce an internal image-containing beam in accordance with the image data;
    at least one mirror, to receive and reflect the internal image-containing beam, resulting in a reflected beam;
    at least one projection lens to receive the reflected beam, and to produce an external image-containing beam;
    a relative movement detector to detect relative movement between the projection system and a reference object and to produce movement information; and
    a mirror movement mechanism, operatively coupled to the at least one mirror, to move one or more of the at least one mirror in response to the movement information.

13. The projection system of claim 12, wherein the mirror movement mechanism comprises:
    a mechanism for moving one or more mirrors in one or more directions.

14. The projection system of claim 12, wherein the mirror movement mechanism comprises:
    a mechanism for pivoting one or more mirrors along one or more axes.

15. A method comprising:
    determining whether substantial relative movement of a projection system has been detected;

when the substantial relative movement has been detected, producing control inputs; and altering operation of one or more image adjustment elements in response to the control inputs wherein the altering operation includes moving one or more mirrors in response to the control inputs.

16. The method of claim 15, wherein determining comprises:

sensing whether the projection system has experienced the substantial relative movement with respect to a projected image.

17. The method of claim 15, wherein determining comprises:

sensing whether the projection system has experienced the substantial relative movement with respect to a projection surface.

18. The method of claim 15, wherein altering operation comprises:

moving one or more lenses of a projection subsystem in response to the control inputs.

19. The method of claim 15, wherein altering operation comprises:

altering operation of one or more coherent light modulators in response to the control inputs.

* * * * *